US011966804B2

(12) United States Patent
Roth

(10) Patent No.: US 11,966,804 B2
(45) Date of Patent: Apr. 23, 2024

(54) RFID AND PACKAGING SUBSTRATE SYSTEMS AND METHODS

(71) Applicant: Avery Dennison Retail Information Services LLC, Mentor, OH (US)

(72) Inventor: Mark W. Roth, North Miami, FL (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 17/776,716

(22) PCT Filed: Nov. 16, 2020

(86) PCT No.: PCT/US2020/060792
§ 371 (c)(1),
(2) Date: May 13, 2022

(87) PCT Pub. No.: WO2021/097453
PCT Pub. Date: May 20, 2021

(65) Prior Publication Data
US 2022/0398425 A1 Dec. 15, 2022

Related U.S. Application Data

(60) Provisional application No. 62/936,451, filed on Nov. 16, 2019.

(51) Int. Cl.
*G06K 19/077* (2006.01)
(52) U.S. Cl.
CPC .............................. *G06K 19/07773* (2013.01)
(58) Field of Classification Search
CPC ................................................ G06K 19/07773
USPC .............................................................. 235/492
See application file for complete search history.

(56) References Cited

U.S. PATENT DOCUMENTS

| 6,018,299 | A | 1/2000 | Eberhardt |
| 6,107,920 | A | 8/2000 | Eberhardt et al. |
| 6,478,229 | B1 | 11/2002 | Epstein |
| 7,901,533 | B2 | 3/2011 | Steidinger |
| 9,830,484 | B1* | 11/2017 | Zerlina .................. G06Q 10/08 |
| 10,395,078 | B1* | 8/2019 | Abebe .................. B65D 25/205 |
| 10,628,725 | B1* | 4/2020 | Mei .................. G06K 19/07309 |

(Continued)

FOREIGN PATENT DOCUMENTS

| EP | 1284320 | 2/2003 |
| EP | 1562829 | 8/2005 |

(Continued)

OTHER PUBLICATIONS

International Preliminary Report on Patentability dated May 17, 2022 issued in corresponding IA No. PCT/US2020/060792 filed Nov. 16, 2020.

(Continued)

*Primary Examiner* — Allyson N Trail

(57) ABSTRACT

In some embodiments, an RFID device includes an RFID chip, a first antenna coupled to the RFID chip, and a cardboard substrate. The RFID chip may be at least one of attached to the cardboard substrate at a position and embedded within the cardboard substrate at the position. The cardboard substrate may form at least part of a carton blank configured to cover the RFID chip position with at least one layer of cardboard when the carton blank has been assembled into a closed box.

32 Claims, 10 Drawing Sheets

(56) References Cited

U.S. PATENT DOCUMENTS

| | | |
|---|---|---|
| 11,004,321 B2 | 5/2021 | Shinohara et al. |
| 11,334,728 B2 * | 5/2022 | Volpi ................. G06K 7/10366 |
| 2003/0075608 A1 * | 4/2003 | Atherton ............ G06K 19/0739 |
| | | 235/492 |
| 2004/0046663 A1 | 3/2004 | Jesser |
| 2006/0187053 A1 | 8/2006 | Koele |
| 2008/0156446 A1 * | 7/2008 | Sekiya ............... G06K 19/0723 |
| | | 156/578 |
| 2008/0182512 A1 * | 7/2008 | Waters ................. H04B 7/0817 |
| | | 455/41.1 |
| 2008/0315997 A1 | 12/2008 | Yamaguchi |
| 2009/0045963 A1 | 2/2009 | Vigneron et al. |
| 2010/0090832 A1 | 4/2010 | Bozet et al. |
| 2011/0308986 A1 * | 12/2011 | Lee ...................... B65D 5/4208 |
| | | 229/120.08 |
| 2018/0241258 A1 * | 8/2018 | Seong ................... B60L 53/126 |
| 2023/0025103 A1 * | 1/2023 | Volkerink ............... H04W 4/33 |

FOREIGN PATENT DOCUMENTS

| | | |
|---|---|---|
| EP | 3348490 | 7/2018 |
| WO | 2010/098643 | 11/2010 |
| WO | 2018/122363 | 7/2018 |
| WO | 2019/088076 | 5/2019 |

OTHER PUBLICATIONS

International Search Report and Written Opinion dated Apr. 1, 2021 issued in corresponding IA No. PCT/US2020/060792 filed Nov. 16, 2020.

Invitation to Pay Additional Fees dated Feb. 11, 2021 issued in corresponding IA No. PCT/US2020/060792 filed Nov. 16, 2020.

\* cited by examiner

RFID AND PACKAGING SUBSTRATE SYSTEMS AND METHODS

CROSS-REFERENCE TO RELATED APPLICATION

The present application is a 371 of International Application No. PCT/US2020/060792, which was published in English on May 20, 2021, and claims the benefit of U.S. Provisional Patent Application No. 62/936,451 filed Nov. 16, 2019, both of which are incorporated herein by reference in their entireties.

BACKGROUND

Generally stated, RFID is the use of electromagnetic energy to stimulate a responsive device (known as an RFID "tag" or transponder) to identify itself and, in some cases, provide additional information and/or data stored in the tag. RFID tags and/or labels typically comprise a combination of antennas and analog and/or digital electronics, which may include, for example, a semiconductor device commonly referred to as the "chip", communications electronics, data memory, and control logic. Typical RFID tags have a microprocessor electrically connected to an antenna, and act as transponders, providing information stored in the chip memory in response to a radio frequency interrogation signal received from a reader, also referred to as an interrogator. The reader/interrogator, in turn, converts the radio waves from the RFID device into a form that can be utilized by a computer. In the case of passive RFID devices, the energy of the interrogation signal also provides the necessary energy to operate the RFID tag device.

RFID tags may be attached to various articles, such as cardboard boxes. However, in some situations after being attached, RFID tags may sometimes become damaged, such as from contact with objects inside or outside of a box. Damage may occur from crushing, abrasion, scratching, or other physical interactions, such as those that may occur during manufacturing, packaging of products, and shipping.

In some other scenarios, a manufacturer, seller, or purchaser may have difficulty determining when a package has been opened. Although there are some methods of demonstrating that tampering took place, some of these methods may allow for evidence to be concealed.

Therefore, there exists a long felt need in the art for an RFID inlay or device for use with a packing carton to improve safety of the tag, to reduce costs, and to improve detection of tampering with a package.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Various embodiments of the present disclosure relate generally to radio-frequency identification (RFID) devices for use with packaging boxes and cartons, and their methods of manufacture or operation. More specifically, the RFID devices may include RFID inlays that may be uniquely applied to a packaging carton or may be otherwise incorporated into a base cardboard or tape material, such as during construction of a corrugated cardboard packaging carton or box. However, it is to be appreciated that aspects of the present invention are also equally amenable to other applications, devices and methods of manufacture.

In some embodiments, an RFID device includes an RFID chip, a first antenna coupled to the RFID chip, and a cardboard substrate. The RFID chip may be at least one of attached to the cardboard substrate at a position and embedded within the cardboard substrate at the position. The cardboard substrate may form at least part of a carton blank configured to cover the RFID chip position with at least one layer of cardboard when the carton blank has been assembled into a closed box.

The first antenna may be or include a small ant loop antenna. The first antenna may provide a near field read capability. The first antenna may be or include a large ant loop antenna. The first antenna may provide a wide field reporting capability.

In various embodiments, an RFID device may include an RFID chip, a first antenna coupled to the RFID chip, and a detection unit coupled to the RFID chip. The RFID chip may be configured to provide tamper information via the first antenna when the detection unit has been damaged. The detection unit may include a second antenna coupled to the RFID chip. The RFID chip may be configured to activate the first antenna when the detection unit has been damaged. The first antenna may be or include a near field antenna. The first antenna may be or include a far field antenna.

The RFID device may include a substrate supporting the RFID chip. The substrate may be or include a web of tape usable to seal the carton. The web of tape may be a packaging tape. The substrate may be dispensed by an automatic sealing apparatus. The substrate may be dispensed by a hand held dispensers. The substrate may be or include a cardboard template used to construct a carton. The RFID chip may be attached to an exterior of the cardboard template at a position where the RFID chip will be disposed on an interior of the carton once the carton is formed. The first antenna may be an inner antenna, and the detection unit may include an outer antenna. The web of tape may include at least one embellishment for locating the RFID chip on the web of tape. The RFID chip may be positioned along a center line of the web of tape.

The RFID chip may be deactivated when cut along the center line of the web of tape. Cutting the web of tape along the center line may deactivate a wide field reporting capability of the RFID chip. The RFID chip may be positioned offset from a center line of the web of tape. The web of tape may be dispensed by an automatic sealing apparatus. The web of tape may be dispensed by a hand held dispenser.

In some embodiments, a method of forming an RFID device may include providing an RFID chip, coupling a first antenna to the RFID chip, and coupling a detection unit to the RFID chip. The RFID chip may be configured to provide tamper information via the first antenna when the detection unit has been damaged. The detection unit may include a second antenna coupled to the RFID chip. The RFID chip may be configured to activate the first antenna when the detection unit has been damaged. The first antenna may be a near field antenna. The first antenna may be a far field antenna. The RFID chip may be supported by a substrate. The substrate may be a web of tape usable to seal the carton. The web of tape may be a packaging tape. The substrate may be dispensed by an automatic sealing apparatus. The substrate may be dispensed by a hand held dispensers. The substrate may be a cardboard template used to construct a carton. The RFID chip may be attached to an exterior of the cardboard template at a position that is configured to be disposed at an interior of the carton once the carton is formed into a closed box.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
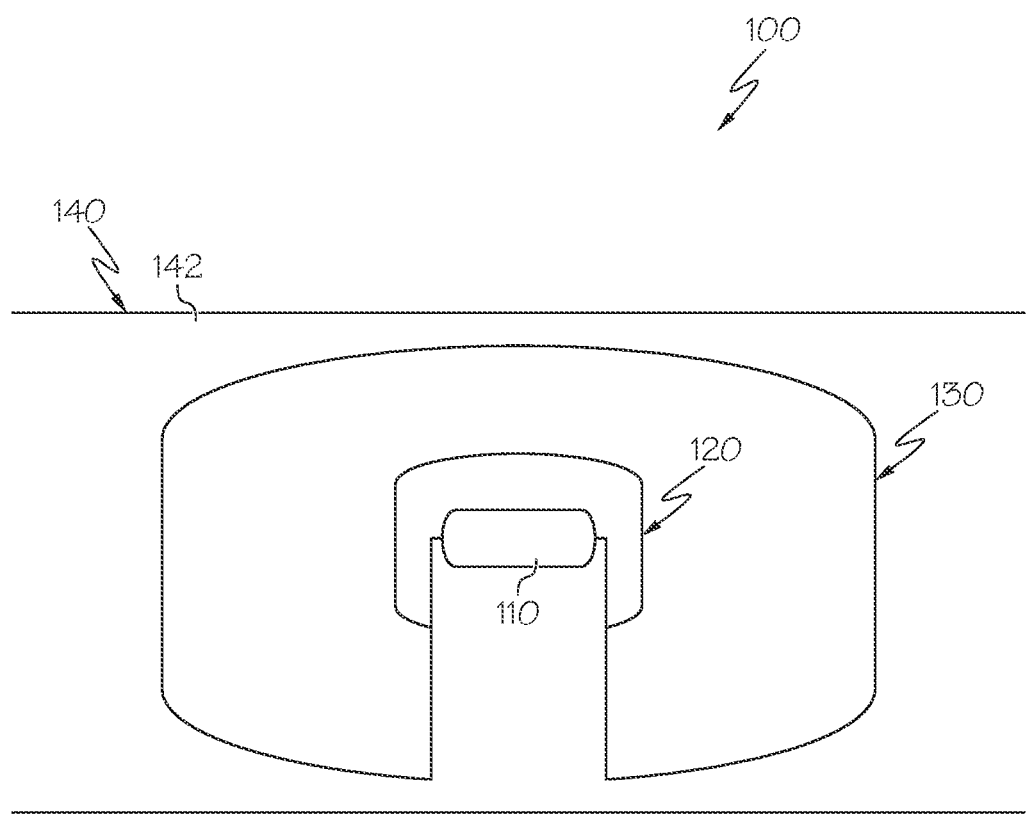
FIG. 1 is a diagram of an RFID inlay attached to a substrate in accordance with some embodiments.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Various embodiments may leverage current manufacturing processes for constructing and sealing cartons, and for some embodiments, add a unique method of attaching an RFID inlay or device to the carton. In some embodiments, an RFID device may be embedded within the cardboard material in several different ways. In other embodiments, an RFID device may be attached to cardboard for a carton at a location where it will become protected as the cardboard box is assembled. In other embodiments, an RFID device may be positioned either inside or outside a box such that when the box is opened, the RFID device may sustain damage in a detectable way.

In various embodiments, automated box erectors may also use adhesive tape to form the bottom of the carton, and can also be utilized as part of the disclosed methods and systems. Utilizing the methods and systems disclosed here may help prevent loss or damage to RFID devices and/or may result in more successful detection of tampering with a box. In addition, by providing methods of consistently applying RFID devices to a box, additional industry issues such as making it easier to consistently detect RFID devices on a box may also be improved.

Referring initially to the drawings, FIG. 1 illustrates a schematic view of an RFID device 100 (e.g., an RFID inlay, an RFID tag) attached to or embedded in a substrate 140. More specifically, RFID device 100 is intended for use with a carton 150 and comprises an RFID chip 110, an inner antenna 120, and an outer antenna 130.

In some embodiments, the RFID chip 110 is an integrated circuit RFID chip that is operatively connected to both the inner antenna 120 and the outer antenna 130, and the inner and outer antennas 120 and 130 may be configured as loop antennas. The outer antenna 130 is larger than the inner antenna 120, and it may surround the inner antenna 120. The outer antenna 130 may be a large ant loop antenna that provides a wide field reporting capability for the RFID device 100. By comparison, the inner antenna 120 may be a small ant antenna that provides a near field read (e.g., NFC) capability for the RFID device 100.

In various embodiments, the inner antenna 120 provides near field read capabilities once the outer antenna 130 is cut as part of the carton opening process or some other external event that damages the outer loop antenna. In various embodiments, the inner antenna 120 may not operate to provide NFC capabilities until the outer antenna 130 becomes nonfunctional due to the configuration of the antennas or due to circuitry or programming of the RFID device 100. In various embodiments, the inner antenna 120 provides NFC capabilities regardless of the condition or operational status of the outer antenna 130.

In some embodiments, damage detection may thus occur because the inner antenna 120 is responsive to scans that occur within range, whereas it would not previously respond if there had been no damage. In some embodiments, damage may be detected because the RFID device 100 no longer responds to wide field scans, whereas it did so prior to damage occurring to the outer antenna 130.

Figure 2A:
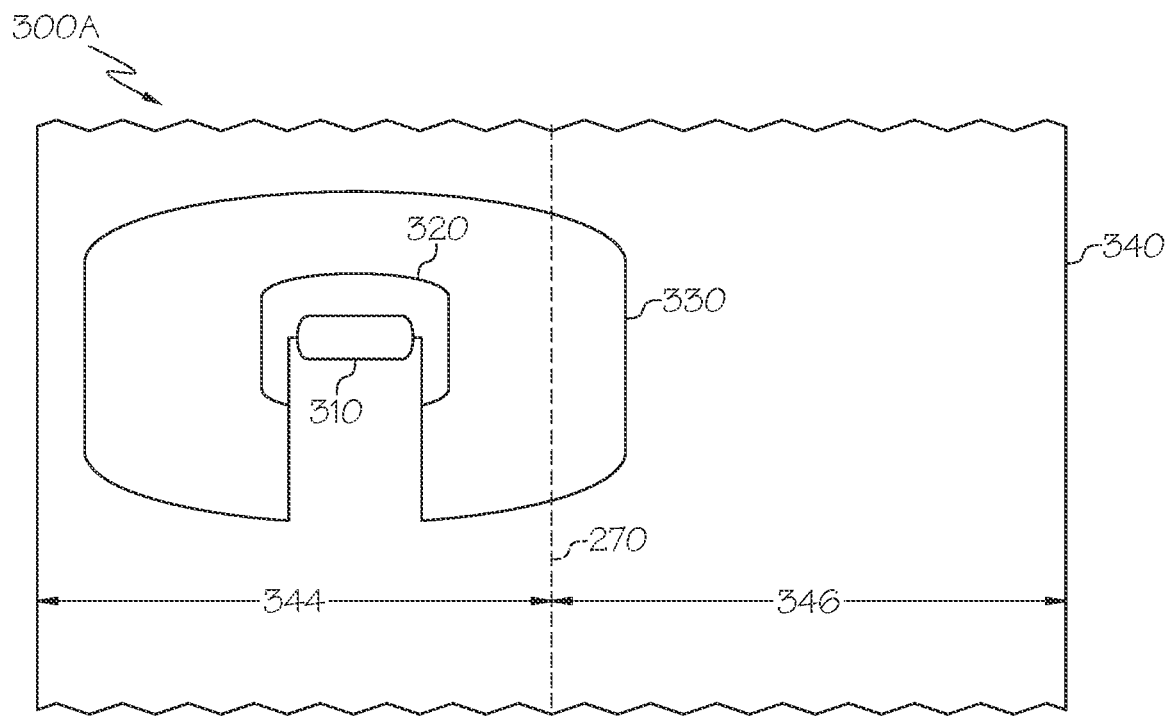
FIGS. 2A and 2B are illustrations of overhead views of RFID devices attached to a substrate in accordance with some embodiments.

For example, in FIG. 2A, an RFID device 300A may include an RFID chip 310, an inner antenna 320, and an outer antenna 330. The RFID device 300A may be disposed on or embedded within a substrate 340. The substrate 340 may be one of or a combination of: plastic, wood, metal, rubber, paper, cardboard, or cloth. In some embodiments, the substrate 340 may be composed of tape or cardboard for forming a box or carton.

RFID device 300A may be disposed such that it overlaps an area or line 270 that may be cut through, such as when a person opens a box that they have received. The RFID device 300 may be positioned such that the outer antenna 330 is expected to be cut, damaged, or broken, but the inner antenna 320 is expected to remain intact. For example, as shown in FIG. 2, the line 270 divides the substrate into a first region 344 and a second region 346. The RFID device 300A may be disposed such that it is substantially within the first region 344 but has partial overlap with the second region 346. In some embodiments, the outer antenna 330 extends from the first region 344 into the second region 346 by crossing the dividing line 270. In various embodiments, the remaining components of the RFID device 300 may not cross the dividing line 270.

The line 270 may correspond with a marked or unmarked section on the substrate 340 that is expected to be cut through. For example, for some embodiments such as when the substrate is a length of tape, the line 270 may represent a line that is cut through. The line 270 may be at or near the middle longitudinal axis of the tape, which may be aligned with and placed over a crack between two edges of opposing box panel edges that are brought into proximity when the box is closed.

In some other embodiments, such as when the substrate is another material such as cardboard, paper, or plastic forming a bag or box, the dividing line 270 may correspond to the location of a dotted cut through line, a perforated dotted line, or an embedded plastic line, any of which are intended to guide and/or make it easier for a user to open a bag or box.

Figure 2B:
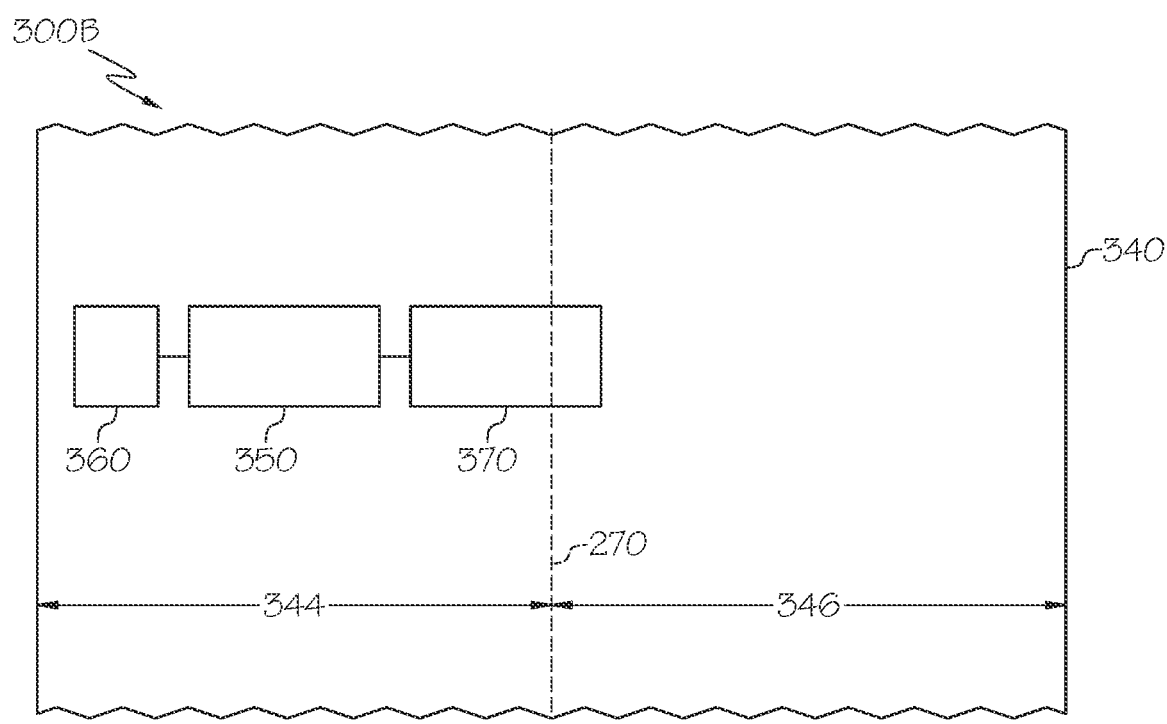

In some embodiments, such as in FIG. 2B, an RFID device 300B may include an RFID chip 350, an antenna 360, and a detecting unit 370. The detecting unit 370 may include an antenna, such as a near field or wide field RFID antenna, a conductive loop, wire, or other trigger or sensor that serves as part of a detection circuit for the RFID chip 350. If the detecting unit 370 is broken or damaged, the detection circuit may be affected or may no longer be operable which may affect a data flag of the RFID chip 350. The data flag of the RFID chip 350 may be readable when devices communicate with the RFID chip 350 via the antenna 360. In various embodiments, the antenna 360 may be configured to provide near field or wide field read or reporting capability.

RFID device 300B may be disposed such that it overlaps an area or line 270 that may be cut through, such as when a person opens a box that they have received. The RFID device 300B may be positioned such that the detecting unit 370 is expected to be cut, damaged, or broken, but the antenna 360 is expected to remain intact. For example, as shown in FIG. 2B, the line 270 divides the substrate into a first region 344 and a second region 346. The RFID device 300B may be disposed such that it is substantially within the first region 344 but has partial overlap with the second region 346. In some embodiments, the detecting unit 370 extends from the first region 344 into the second region 346 by crossing the dividing line 270. In various embodiments, the remaining components of the RFID device 300B may not cross the dividing line 270.

As described with respect to FIG. 2A, the line 270 may correspond with a marked or unmarked section on the substrate 340 that is expected to be cut through. For example, for some embodiments such as when the substrate is a length of tape, the line 270 may represent a line that is cut through. The line 270 may be at or near the middle longitudinal axis of the tape, which may be aligned with and placed over a crack between two edges of opposing box panel edges that are brought into proximity when the box is closed.

In some other embodiments, such as when the substrate is another material such as cardboard, paper, or plastic forming a bag or box, the dividing line 270 may correspond to the location of a dotted cut through line, a perforated dotted line, or a removable embedded plastic line, any of which are intended to guide and/or make it easier for a user to open a bag or box. Once the dotted line is cut through with a knife or scissors, or a user punches open the perforated dotted line or tears across it, or the removable embedded plastic line is torn out to create an opening, the detecting unit 370 may be damaged or broken. This in turn may trigger a change in the data flag of the RFID chip 350, which can be read via the antenna 360.

Figure 3A:
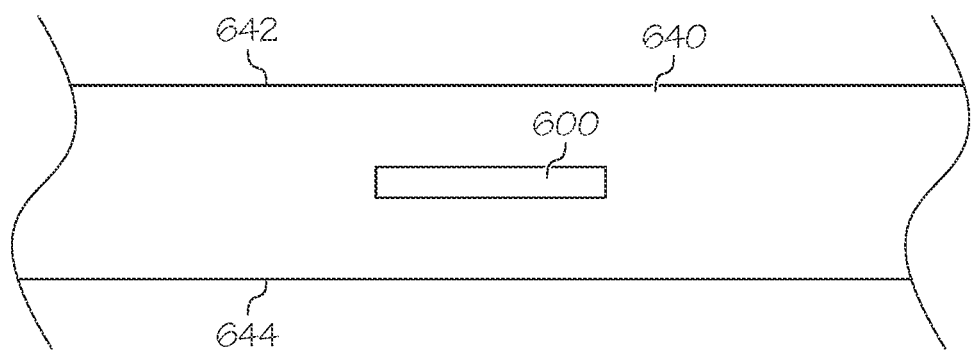
FIGS. 3A and 3B are illustrations of cross-sectional views of RFID devices embedded within a substrate in accordance with some embodiments.
Figure 3B:
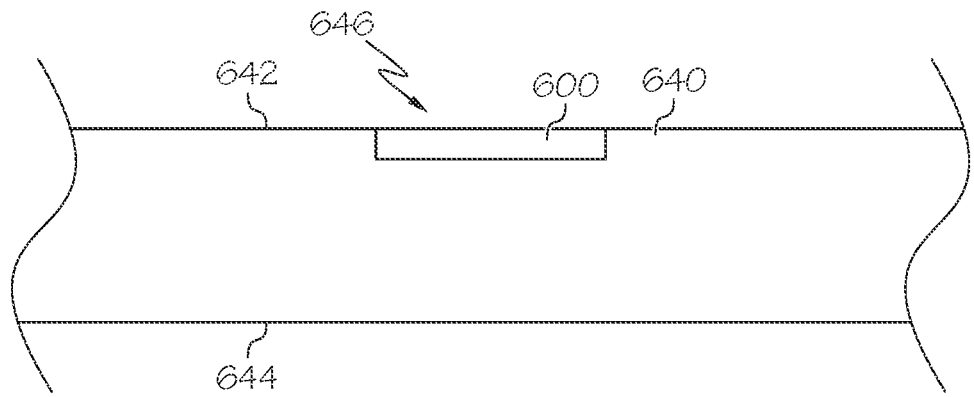

In some embodiments, the RFID device 100 may be embedded within the substrate 140 such that the RFID device 100 is covered on both top and bottom by the material forming the substrate 140 (e.g., wood, plastic, metal, paper, cardboard, rubber, tape), so that the RFID device 100 is embedded within the actual layer of material forming the substrate 140. For example, as shown in FIG. 3A, an RFID inlay 600 may be disposed such that it is surrounded on all sides by the substrate 140 (e.g., tape). The RFID inlay 600 is disposed between a first surface 642 and a second surface 644 of the tape. One or both of the first surface 642 and the second surface 644 of the tape may be covered with an adhesive. In other embodiments, being embedded in the tape may mean that the RFID inlay 600 is adhered to one side of the tape. In other embodiments, the RFID device 100 is embedded within the tape by being placed in a cavity on a surface of the tape. For example, as shown in FIG. 3B, the RFID inlay 600 may be disposed within a cavity 646 formed in the first surface 642 of the substrate 640. Either or both of the first surface 642 and the second surface 644 may be covered with adhesive.

Cardboard

Figure 4:
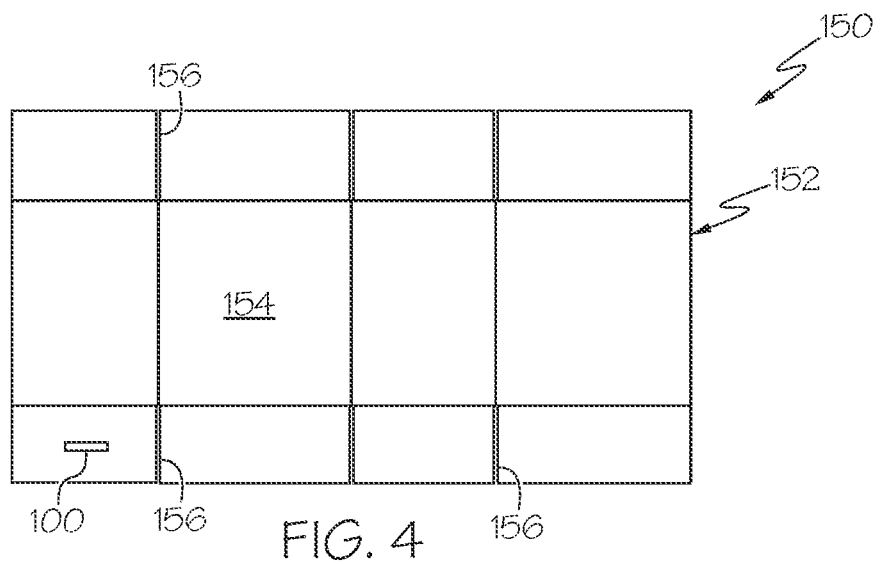
FIG. 4 is an overhead view of a cardboard template for forming a carton with the embedded RFID inlay in accordance with some embodiments.
Figure 5:
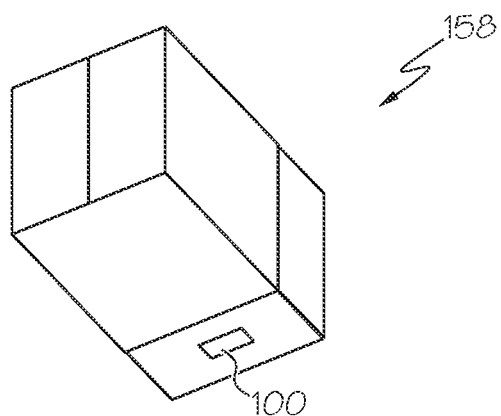
FIG. 5 is a perspective view of a partially sealed carton with an RFID device in accordance with some embodiments.
Figure 6:
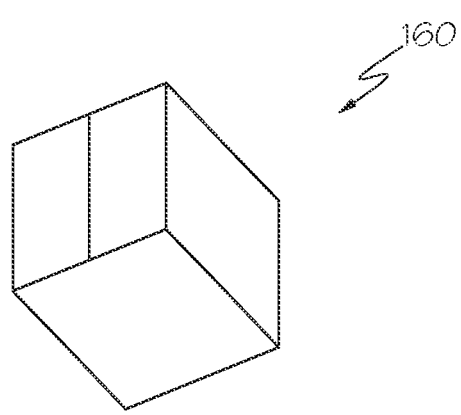
FIG. 6 is a perspective view of a closed carton with a covered RFID device in accordance with some embodiments.

In some embodiments, such as shown in FIGS. 4, 5, and 6, the substrate (e.g., substrate 140, 340, or 640) may be a cardboard template 152 that is used to form or construct the carton 150, such as a cardboard carton, with the use of glue or other adhesives (not shown). For example, in the embodiment depicted in FIG. 4, the RFID device 100 is embeddable on, or within, an exterior 154 of the cardboard template 152. The cardboard template 152 is then formed into a partially sealed carton 158 (as best illustrated in FIG. 3), where a bottom of the carton 150 is glued together, and a top of the carton 150 remains open for subsequent filling. The RFID device 100 remains attached to cardboard template 152. The RFID device 100 becomes covered by folds 156 (e.g., layers) of sections of the cardboard template 152 as the cardboard template 152 is formed into the fully enclosed carton 160, as illustrated in FIG. 4.

In what is referred to in the industry as the "glue up" process, a standard taping process could be used to finish sealing a top of the carton 150 since the RFID device 100 is already embedded in the folds 156 of the fully enclosed carton 160. Further, when positioned between the plurality of folds 156, the RFID device 100 is protected and is properly spaced to allow for an inherent air gap. The air gap reduces the effect that a countertop, work station, or belt might have in potentially blocking or detuning the RFID device 100. This particular placement positions the RFID device 100 between the plurality of folds 156 or layers of cardboard, which are disposed both above and below the RFID device 100.

Further, the RFID device 100 may be attached to or embedded in the cardboard template 152 prior to the fold and glue up process. This positioning lends itself to an initially exterior application of the RFID device 100, which then becomes internal as the carton 150 is folded for assembly into the fully enclosed carton 160 depicted in FIG. 4. Additionally, the location of the RFID device 100 on, for example, a bottom of the carton 150 can now be leveraged by an RFID reading apparatus (not shown) as the inner and outer antennas 120 and 130 may be near the work surface on which the carton 150 is placed but separated from the work surface by the intervening layer or layers of cardboard in which the RFID device 100 is attached or embedded. The RFID reading apparatus (not shown) used to read or interrogate the RFID inlays 100 may be integrated into the frame of a conveyer belt system. For example, the RFID reading apparatus may be disposed below the belt, and the carton 150 that has the antennas 120 and 130 disposed in the bottom of the carton 150 may sit on the belt that passes over the reading apparatus.

Figure 7A:
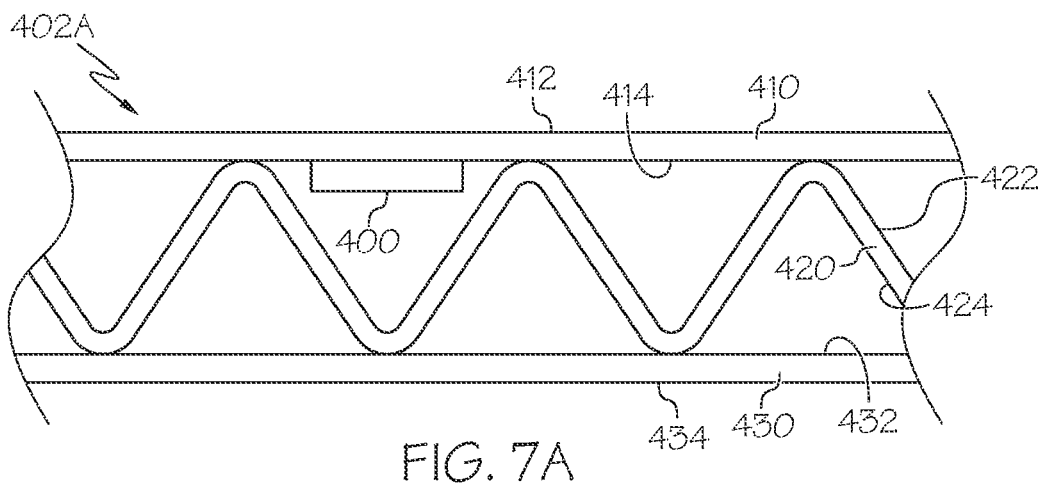
FIGS. 7A to 7E are cross-sectional views of RFID devices embedded within a substrate in accordance with some embodiments.
Figure 7B:
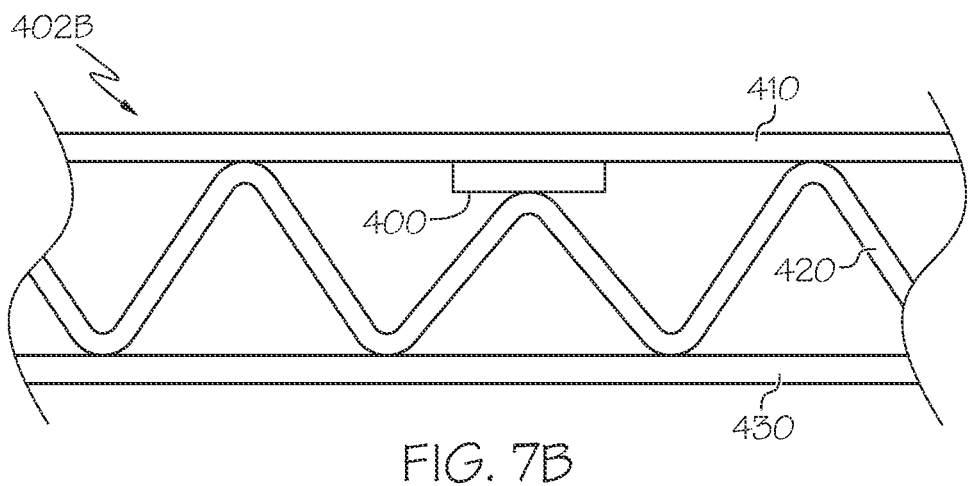
Figure 7C:
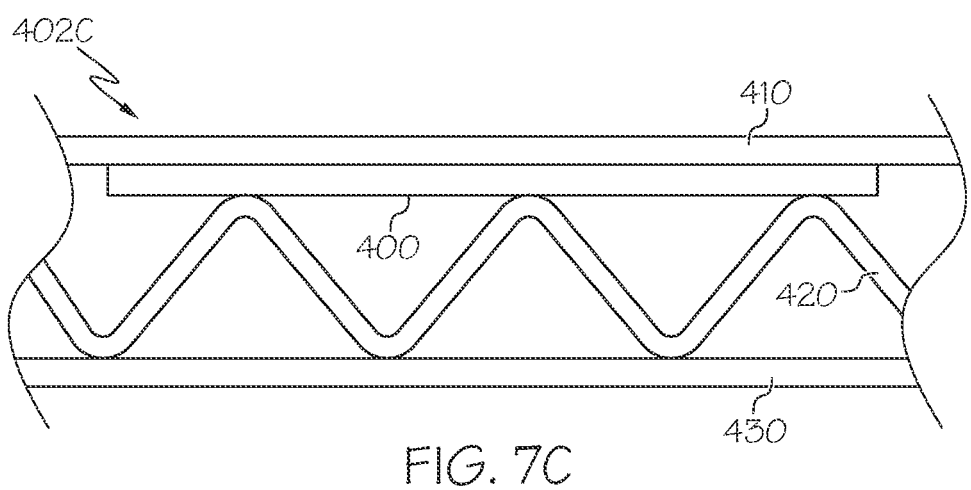
Figure 7D:
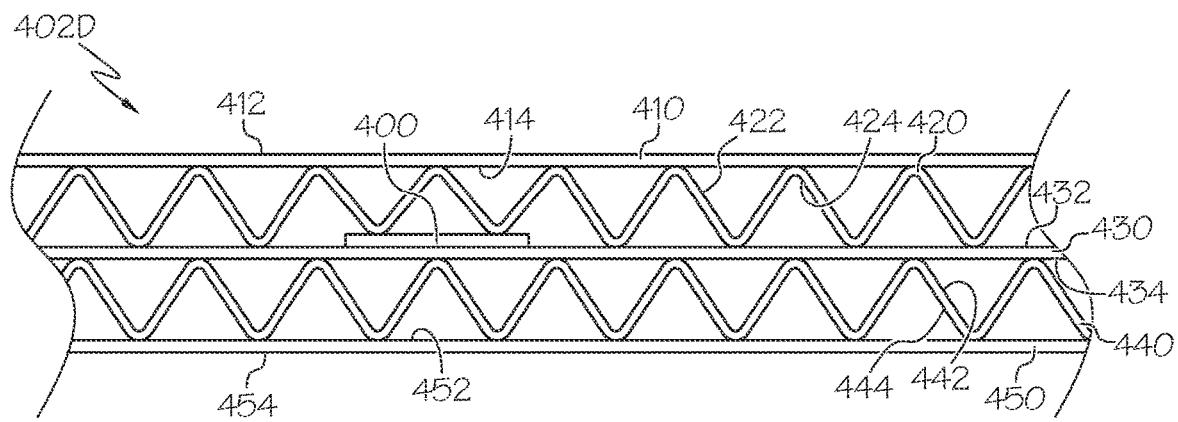
Figure 7E:
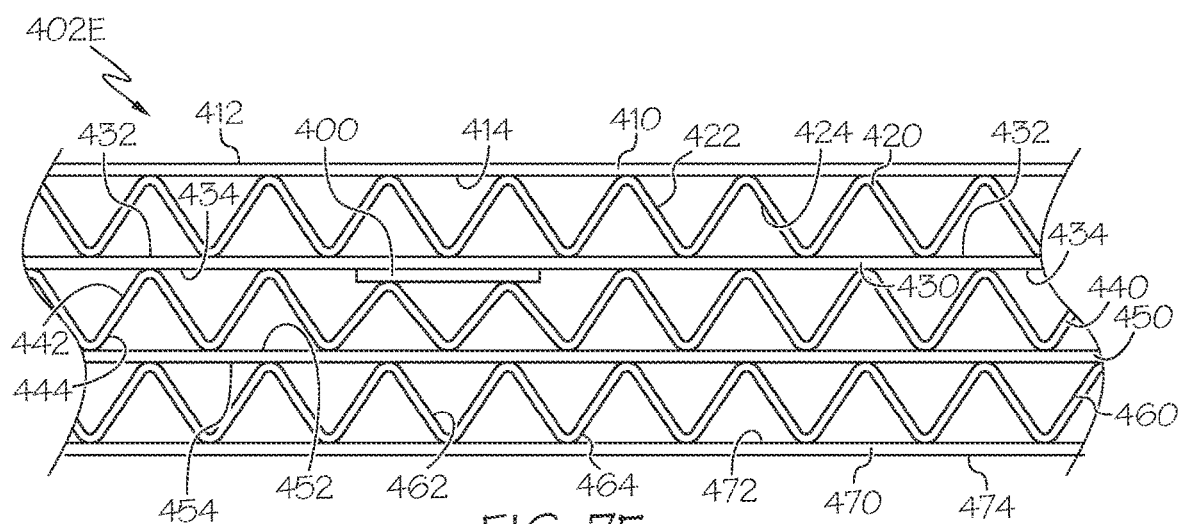
Figure 8:
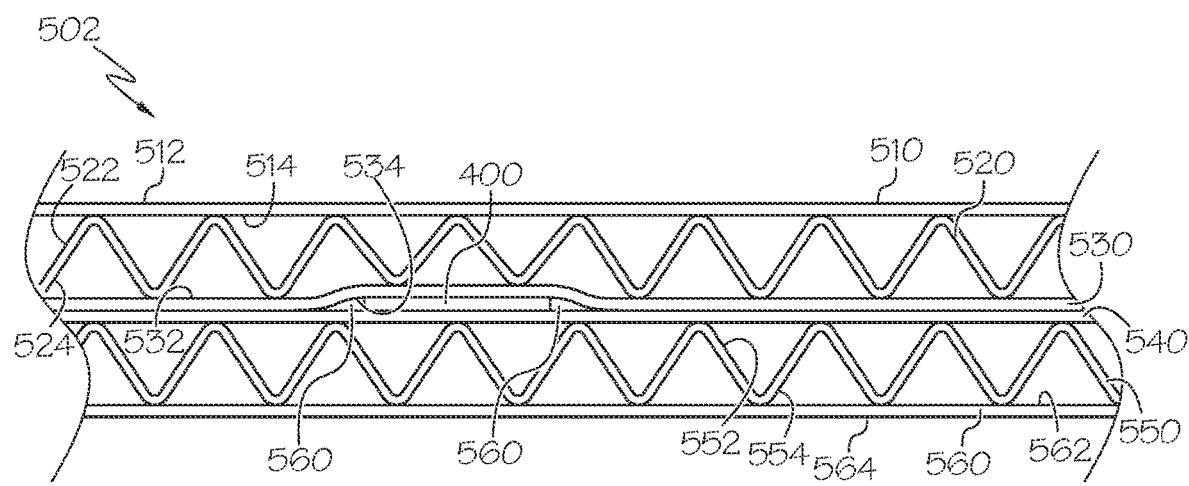
FIG. 8 is a cross sectional view of an RFID device and a substrate in accordance with some embodiments.

In some embodiments, an RFID device 400 (e.g., an RFID chip) may be disposed within the structure of a layer of cardboard or other materials (e.g., plastic, steel, wood, paper, rubber), such as shown in FIGS. 7-8. For example, in FIG. 7A, a substrate 402A may include a first layer 410, a second layer 420, and a third layer 430. The first layer 410 may have a first surface 412 and a second surface 414. The second layer 420 may have a first surface 422 and a second surface 424. The third layer 430 may have a first surface 432 and a second surface 434.

In some embodiments, the substrate 402 is cardboard, and the first layer 410 and the third layer are made of paper, which may have varying degrees of thickness, stiffness, and quality. The second layer 420 may be a fluted layer of paper material that is glued to the first layer 410 and the third layer 430.

In some embodiments, such as in FIGS. 7A, 7B, and 7C, the RFID device 400 is glued or otherwise attached to the second surface 414 of the first layer 410. Depending on the size of the RFID device 400 and the size of the fluting of the second layer 420, the RFID device 400 may be directly contacted by only the first layer 410, or the first layer 410 and one or more ridges of the second layer 420. Avoiding contact with the second layer 420 may help to avoid stress on the RFID device 400. Contacting the second layer 420 in one or more locations, however, may result in improved load distribution for the substrate 402 (e.g., substrate 402A, 402B, 402C).

In some embodiments, the substrate 402 may include additional fluted and/or flat layers. For example, a double layer substrate 402 may be seen in FIG. 7D, and a triple layer substrate may be seen in FIG. 7E. In FIG. 7D, the substrate 402D includes, in addition to the layers of FIGS. 7A, 7B, and 7C, a fourth layer 440, a first surface 442, a second surface 444, a fifth layer 450, a first layer 452, and a second surface 454. The fourth layer 440 may be a fluted layer, while the fifth layer 450 may be a flat layer.

In FIG. 7E, in addition to the layers of FIG. 7D, the substrate 402E includes a sixth layer 460, a first surface 462, a second surface 464, a seventh layer 470, a first layer 472, and a second surface 474. The sixth layer 460 may be a fluted layer, and the seventh layer 470 may be a flat layer.

In various embodiments, the RFID device 400 may be attached to or embedded within the third layer 430. For example, in FIG. 7D, the RFID device 400 may be disposed between the second surface 424 of the second layer 420 and the first surface 432 of the third layer 430.

In various embodiments, such as in FIG. 7E, the RFID device 400 may be attached to or embedded within the second surface 434 of the third layer 430, and may further be attached to or embedded within the first surface 442 of the fourth layer 440.

In various embodiments, such as in FIG. 8, an RFID device 400 may be attached to an outside surface of a substrate 502 that is covered by another layer of the substrate 502 during assembly of a structure such as a box. In some embodiments, the assembled structure may include a first layer 510, a first surface 512, a second surface 514, a second layer 520, a first surface 522, a second surface 524, a third layer 530, a first surface 532, a second surface 534, a fourth layer 540, a first surface 542, a second surface 544, a fifth layer 550, a first surface 552, a second surface 554, a sixth layer 560, a first surface 562, a second surface 564.

In some embodiments, the RFID device 400 is sandwiched between the second surface 534 of the third layer 530 and the first surface 542 of the fourth layer 540. In some embodiments, the RFID device 400 is adhered to one or both of the third layer 530 and the fourth layer 540. In some embodiments, one or both of the third layer 530 and the fourth layer 540 are deformed around the RFID device 400. In some embodiments, the third layer 530 and the fourth layer 540 are both flat layers that initially formed outer layers of a carton blank 152.

Tape

Figure 9:
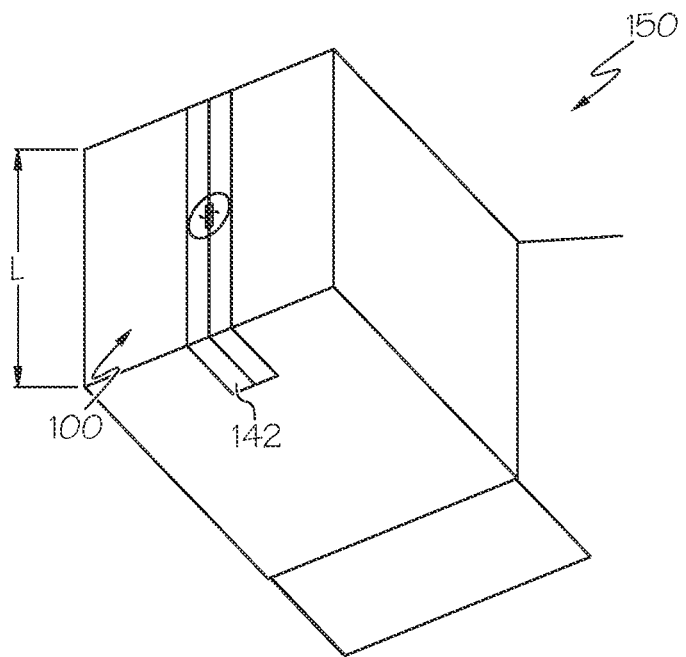
FIG. 9 illustrates a perspective view of a web of tape with an embedded RFID inlay attached to a carton in accordance with some embodiments.

In some embodiments, the substrate 140 may be formed from, include, or be used to compose a tape. The RFID device 100 may be embedded in or attached to substrate 140 (e.g., tape) at a consistent interval I (see FIG. 10) which may be greater than a length (L) of the carton 150, as best illustrated in FIG. 9. In various embodiments, the length (L) may vary between 1 inch and 120 inches. Exemplary lengths L may include 1, 2, 3, 4, 5, 6, 7, 8, 9, 10, 12, 15, 20, 24, 30, 36, 40, 42, and 48 inches, although other lengths may be used. The interval I may be between 1 and 10 inches longer than the length L and/or between 1% and 5% greater, 5% and 10% greater, or 10% and 15% greater than the length L. In some embodiments, the interval between RFID inlays 100 along substrate 140 may also be selected by the user to suit his or her needs or preferences, such as for custom creation of RFID tape. As also illustrated in FIG. 9, the substrate 140 may be a web of tape 142 used to seal the carton 150.

Figure 10:
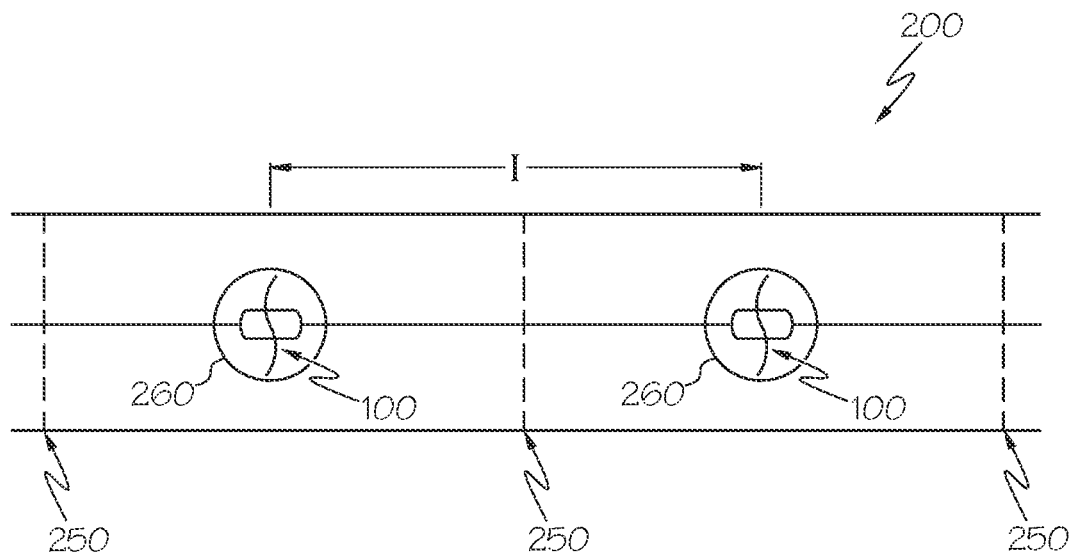
FIG. 10 illustrates an overhead view of the web of tape comprising a plurality of RFID inlays for use with a plurality of cartons in accordance with some embodiments.

FIGS. 9 and 10 illustrate an example of a web of tape 200 for constructing or sealing each of a plurality of cartons 150. More specifically, the web of tape 200 comprises a plurality of spaced apart RFID inlays 100, each of said RFID inlays comprising an RFID chip 110, an inner antenna 120, and an outer antenna 130. In some embodiments, the RFID chip 110 may include an integrated circuit RFID chip that is operatively connected to both the inner antenna 120 and the outer antenna 130. The inner and outer antennas 120 and 130 are configured as loop antennas, as discussed previously. Additionally, the outer antenna 130 provides a wide field reporting capability for the RFID device 100, and the inner antenna 120 may provide a near field read capability for the RFID device 100 once the outer antenna 130 is cut as part of the carton opening process or some other external event. The web of tape 200 in various examples refers to a packaging tape used for constructing or sealing cartons.

The web of tape 200 further comprises a plurality of intervals (I) indicated by a plurality of index marks 250, or registration marks, that are based on a length (L) of each of the plurality of cartons 150. More specifically, each of the RFID inlays 100 are uniformly embedded within the web of tape 200 along each of plurality of intervals (I) (as shown in FIG. 9), which are, in turn, based on the carton length (L)(as shown in FIG. 10). This of course assumes that each carton 150 is substantially uniform in shape and size such that the length of tape required to seal each carton 150 would be the same each and every time it is dispensed and applied to carton 150. Of course, it is also contemplated that the intervals could be modified or even varied to accommodate other shapes and sizes of cartons or other packaging containers.

Nonetheless, in the embodiment depicted in FIG. 9, the plurality of index marks 250 are used to indicate a prescribed length of the web of tape 200 for use with each carton 150. Additionally, the plurality of index marks 250 may be used to assist an operator who is tasked with reloading an automated dispensing apparatus (not shown) with a new roll of a web of tape 200. More specifically, the operator may use the plurality of index marks 250 to properly align or register the new web of tape 200 to one of the index marks 250 that indicate a cut point to create a cut tape segment for each carton 150. The plurality of index marks 250 may be any material, such as a printable ink, that is compatible with the composition of the web of tape 200. Essentially, the plurality of index marks 250 in this particular application would be used as a visual reference for the operator.

Since the web of tape 200 may be manufactured from a variety of materials, such as a clear material or a fiber paper material, it is important to indicate a position or location of each or the plurality of RFID inlays 100 on the web of tape 200. Therefore, the web of tape 200 may further comprise a plurality of embellishments 260 positioned on the web of tape 200 to locate or reference each RFID device 100, as best shown in FIG. 10. The plurality of embellishments 260 are an external marking for indicating those positions. If ink is used, the web of tape 200 may be embellished with a symbol or other indicator that designates the position of each RFID device 100.

Figure 11:
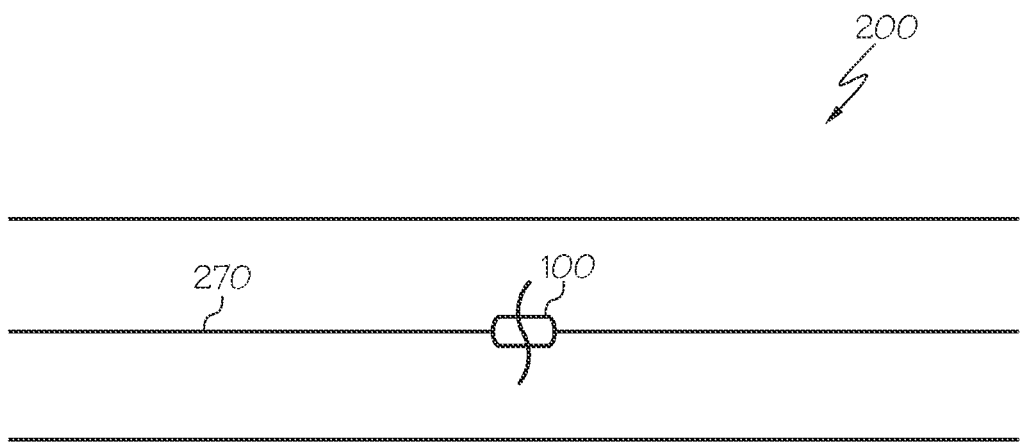
FIG. 11 illustrates an overhead view of the web of tape wherein the RFID inlay is positioned generally along a center line of the web of tape in accordance with some embodiments.
Figure 12:
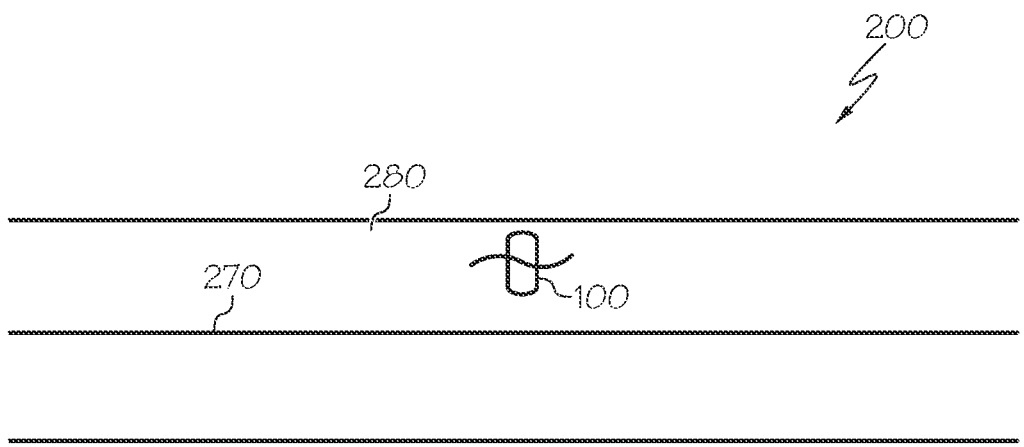
FIG. 12 illustrates an overhead view of a web of tape wherein the RFID inlay is positioned at an offset from the center line of the web of tape in accordance with some embodiments.

As best shown in FIGS. 11 and 12, the web of tape 200 may further comprise a center line 270, and an offset position 280. The plurality of RFID inlays 100 may be positioned either along the center line 270 of the web of tape 200 as illustrated in FIG. 11, or offset from the center line 270 in the offset position 280 of the web of tape 200 as illustrated in FIG. 12. One advantage of placing an RFID device 100 in the offset position 280 is that the RFID device 100 will remain intact or at least partially intact if the web of tape 200 is cut along the center line 270, such as if a user uses a knife cut the tape 200 to open the carton 150. Tape 200 may be extended and aligned with the relatively small elongated opening between two closed flaps of carton 150, and the tape 200 may connect the two flaps together such that the center line 270 is substantially parallel to and disposed between the two adjacent edges of two closed flaps of carton 150. The edges of the tape 200 on alternate sides of the center line 270 may each be attached to a different one of the two closed flaps such that the tape straddles the gap between the two closed flaps of carton 150.

In some embodiments, when the RFID device 100 is positioned on the center line 270 (as shown in FIG. 11), cutting the web of tape 200 along the center line 270 may cut through the affected RFID device 100, thereby making it inoperable. This would allow for deactivation of the RFID device 100 as a means of removing it from being potentially read as part of an active inventory. Additionally, depending on the particular positioning of the RFID device 100 in the offset position 280, the outer antenna 130 may be cut or severed, while preserving the inner antenna 120. This would result in a deactivation of the RFID inlay's 100 wide field reporting capability, but a preservation of the RFID inlay's 100 near field read capability. In other embodiments, the RFID device 100 may be positioned such that cutting a box open will damage the detecting unit 370, which may alter a data flag of the RFID chip 350. The altered detection flag may be readable when devices communicate with the RFID chip 350 via the antenna 360.

In some embodiments, by embedding the RFID inlays 100 in the web of tape 200, the web of tape 200 itself becomes a carrier for the RFID inlays 100. By comparison, in a typical labelling scenario, a label having, for example, a UCC 128 barcode may be used to identify cartons related to an advanced shipping notice. The label would have an RFID inlay laminated into various layers that make up a typical pressure sensitive label dispensed from a printer. Therefore, embedding the RFID device 100 into the web of tape 200 also has the potential to eliminate the extra cost associated with having a printer to encode and dispense labels, thereby providing additional economic value to the user.

In some embodiments, embedding the RFID inlays 100 into the web of tape 200 may provide a superior open-air encoding process for the RFID inlays 100 given that it may provide more consistently positioned the RFID inlays 100 that may be more reliably accessed, such as from below or above a box on a conveyer belt. More consistent positioning and access may provide manufacturing line advantages for system architecture of the encoding hardware. For example, a smaller antenna and/or a lower power setting may be used to read RFID labels on a carton 150. This approach may differ from some current methods, wherein an RFID label may be placed on virtually any side of a carton 150, which may make the RFID reader/encoder solution significantly more complex and costly to implement. For some embodiments using the near field antenna, and consistent carton dimensions may also mean that a single near field antenna may be employed, which can inherently and significantly reduces the odds of errantly encoding nearby RFID inlays, such as due to its shorter range.

Figure 13:
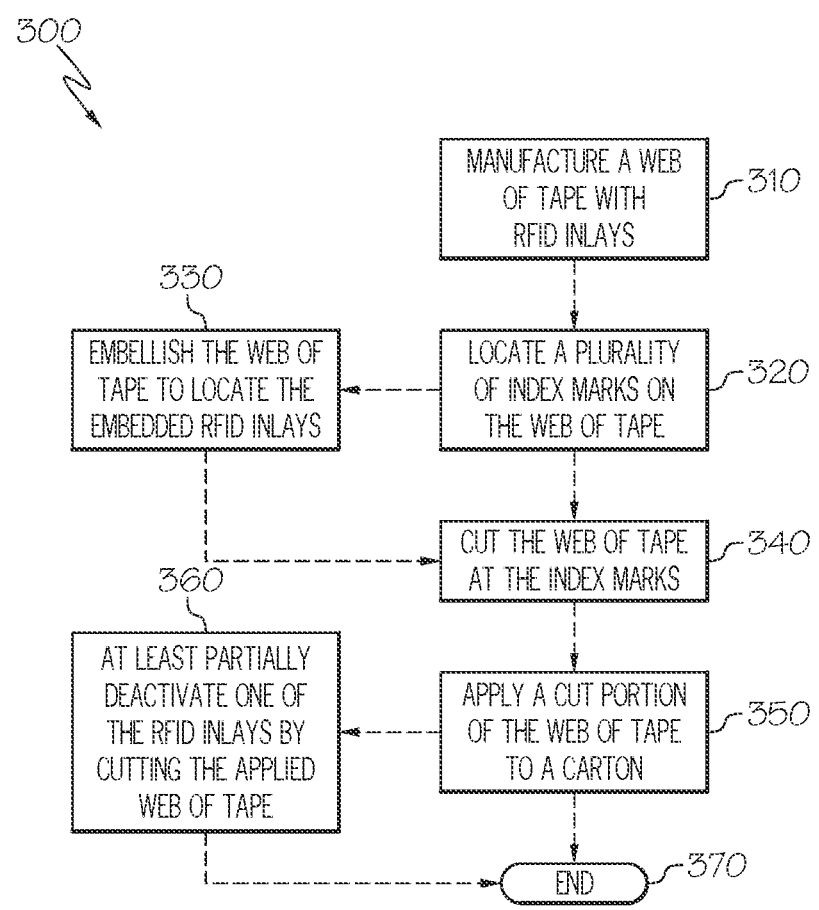
FIG. 13 illustrates an exemplary method of uniformly applying a plurality of RFID inlays to a plurality of cartons in accordance with some embodiments.

FIG. 13 illustrates an exemplary method 300 of uniformly applying a plurality of RFID inlays 100 to a plurality of cartons 150. For example, a web of tape 200 with a plurality of RFID inlays 100 embedded thereon may be manufactured at step 310. The plurality of RFID inlays 100 are embedded within the web of tape 200 at a plurality of intervals (I), which are determined based on a length (L) of each of the plurality of cartons 150 which are substantially uniform in dimension. Each RFID device 100 may comprise an RFID chip 110, an inner antenna 120, and an outer antenna 130. The RFID chip 110 may be operatively connected to each of the inner antenna 120 and the outer antenna 130, and the inner and outer antennas 120 and 130 may be configured as loop antennas. More specifically, the outer antenna 130 may provide a wide field reporting capability for the RFID device 100, and the inner antenna 120 may provide a near field read capability for the RFID device 100 once, or if, the outer antenna 130 is cut as part of the carton opening process or another external event.

At step 320, a plurality of index marks 250 are located and positioned on the web of tape 200 based on the length (L) of each of the plurality of cartons 150, and a plurality of embellishments 260 may be created or embellished on the web of tape 200 to locate or externally reference each RFID device 100 at step 330. The plurality of RFID inlays 100 may be positioned along the center line 270 of the web of tape 200 (as shown in FIG. 11), or offset from the center line 270 in the offset position 280 of the web of tape 200 (as shown in FIG. 12). The plurality of RFID inlays 100 are identically located and embedded within the web of tape 200, so that, when the web of tape 200 is applied to the cartons 150, each RFID device 100 is substantially identically positioned on each carton 150.

At step 340, the web of tape 200 is cut along the plurality of index marks 250, thereby creating individual, uniform lengths of tape, each having an RFID device 100 identically positioned thereon. At step 350, the cut portion of the web of tape 200 from step 340 and having one of the embedded RFID inlays 100 thereon is applied to one of the cartons 150 to seal the carton 150. At step 360, a user may at least partially deactivate one of the RFID inlays 100 by cutting the applied web of tape 200 along a center line 270 or the offset position 280, depending on the particular location of the RFID device 100.

For example, if the RFID device 100 is in the offset position 280, the RFID device 100 will remain intact or at least partially intact when the web of tape 200 is slit by a knife when opening the carton 150. If the RFID device 100 is positioned on the center line 270, cutting the web of tape 200 along the center line 270 will cut through the affected RFID device 100, thereby making it inoperable. Depending on the positioning of the RFID device 100 in the offset position 280 cutting along the center line 270 could allow the outer antenna 130 to be cut while preserving the inner antenna 120, thereby deactivating the wide field reporting capability of the RFID device 100 while preserving its near field read capability. The method then ends at step 370, although in various embodiments, additional and/or different related operations may be performed.

The terms "one or more of a, b, and c", "at least one of a, b, and c", and "at least one of a, b, or c" are intended to refer to a, b, c, or combinations thereof including 1) one or multiple of a and one or multiple of b, 2) one or multiple of b and one or multiple of c, 3) one or multiple of a and one or multiple of c, 4) one or multiple of a, 5) one or multiple of b, or 6) one or multiple of c.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An RFID device comprising:
an RFID chip;
an inner antenna and an outer antenna are coupled to the RFID chip; and
a substrate,
wherein the RFID chip is at least one of attached to the substrate at a position and embedded within the substrate at the position, and
wherein the substrate forms at least part of a carton blank configured to cover the RFID chip position with at least one layer of substrate when the carton blank has been assembled into a closed box;
the outer antenna is disposed to overlap an area or line on the substrate which is expected to be cut through when the substrate has formed part of the closed box; and
the inner antenna and the RFID chip both are disposed within the area or the line on the substrate which are expected to remain intact when the closed box is opened.

2. The device of claim 1, wherein the inner antenna is a small ant loop antenna.

3. The device of claim 1, wherein the inner antenna provides a near field read capability.

4. The device of claim 1, wherein the outer antenna is a large ant loop antenna.

5. The device of claim 1, wherein the outer antenna provides a wide field reporting capability.

6. An RFID device comprising:
an RFID chip, wherein the RFID chip is at least one of attached to a substrate at a position and embedded within the substrate at the position;
an inner antenna coupled to the RFID chip;
a detection unit comprises an outer antenna coupled to the RFID chip;
the outer antenna is disposed to overlap an area or line on a substrate which is expected to be cut through when the substrate has formed part of a closed box;
the inner antenna and the RFID chip both are disposed within the area or the line on the substrate which are expected to remain intact when the closed box is opened; and
wherein the RFID chip is configured to provide tamper information via the inner antenna when the detection unit has been damaged.

7. The device of claim 6, wherein the RFID chip is configured to activate the inner antenna when the detection unit has been damaged.

8. The device of claim 6, wherein the inner antenna is a near field antenna.

9. The device of claim 6, wherein the inner antenna is a far field antenna.

10. The device of claim 6, further comprising a substrate supporting the RFID chip, wherein the substrate includes a web of tape usable to seal a carton.

11. The device of claim 10, wherein the web of tape is a packaging tape.

12. The device of claim 10, wherein the substrate is dispensed by an automatic sealing apparatus.

13. The device of claim 10, wherein the substrate is dispensed by a hand held dispensers.

14. The device of claim 10, wherein the substrate is a cardboard template used to construct the carton.

15. The device of claim 14, wherein the RFID chip is attached to an exterior of the cardboard template at a position where the RFID chip will be disposed on an interior of the carton once the carton is formed.

16. The device of claim 10, wherein the web of tape comprises at least one embellishment for locating the RFID chip on the web of tape.

17. The device of claim 10, wherein the RFID chip is positioned along a center line of the web of tape.

18. The device of claim 10, wherein the RFID chip is deactivated when cut along the center line of the web of tape.

19. The device of claim 10, wherein cutting the web of tape along the center line deactivates a wide field reporting capability of the RFID chip.

20. The device of claim 10, wherein the RFID chip is positioned offset from a center line of the web of tape.

21. The device of claim 10, wherein the web of tape is dispensed by an automatic sealing apparatus.

22. The device of claim 10, wherein the web of tape is dispensed by a hand held dispenser.

23. A method of forming an RFID device, the method comprising:
- providing an RFID chip, wherein the RFID chip is at least one of attached to a substrate at a position and embedded within the substrate at the position;
- coupling an inner first antenna to the RFID chip;
- coupling a detection unit to the RFID chip, wherein the detection unit comprises an outer antenna;
- disposing the outer antenna on the substrate to overlap an area or line which is expected to be cut through when the substrate has formed part of a closed box;
- disposing the inner antenna and the RFID chip within the area or the line on the substrate which are expected to remain intact when the closed box is opened; and
- wherein the RFID chip is configured to provide tamper information via the inner antenna when the detection unit has been damaged.

24. The method of claim 23, wherein the RFID chip is configured to activate the inner antenna when the detection unit has been damaged.

25. The method of claim 23, wherein the inner antenna is a near field antenna.

26. The method of claim 23, wherein the inner antenna is a far field antenna.

27. The method of claim 23, wherein the RFID chip is supported by a substrate, wherein the substrate includes a web of tape usable to seal a carton.

28. The method of claim 27, wherein the web of tape is a packaging tape.

29. The method of claim 27, wherein the substrate is dispensed by an automatic sealing apparatus.

30. The method of claim 27, wherein the substrate is dispensed by a hand held dispensers.

31. The method of claim 27, wherein the substrate is a cardboard template used to construct a carton.

32. The method of claim 31, wherein the RFID chip is attached to an exterior of the cardboard template at a position that is configured to be disposed at an interior of the carton once the carton is formed into a closed box.

* * * * *